United States Patent

Strauss

[15] 3,692,398
[45] Sept. 19, 1972

[54] PROJECTOR

[72] Inventor: Martin Strauss, 6005 Durbin Road, Bethesda, Md. 20014

[22] Filed: March 16, 1970

[21] Appl. No.: 19,766

[52] U.S. Cl. .......................353/26, 353/76, 353/78, 353/102
[51] Int. Cl. ....G03b 23/12, G03b 21/22, G03b 21/20
[58] Field of Search.....................353/26, 76, 78, 102

[56] References Cited

UNITED STATES PATENTS

| | | | |
|---|---|---|---|
| 2,937,569 | 5/1960 | Wilton | 353/78 |
| 3,076,377 | 2/1963 | Brownscombe | 353/102 |
| 3,536,394 | 10/1970 | Rosenburgh | 353/101 |

*Primary Examiner*—Leonard Forman
*Assistant Examiner*—Steven L. Stephan
*Attorney*—Larson and Taylor

[57] ABSTRACT

A projector comprising a film supply support and a film receiving support for film supply means and film receiving means, respectively, means for advancing film from said film supply means to said film receiving means, a light source providing light through said film, an image surface, an optical system for projecting an image from the film to said image surface, said optical system comprising a lens of lower magnification and a lens of high magnification positioned transversely one to the other with respect to a common field of view, shifting means for interchangeably positioning said lenses behind said film, said lens of higher magnification projecting an image reduced in area compared to that projected by said lens of lower magnification to project select areas of the image projected by said lens of lower magnification.

8 Claims, 7 Drawing Figures

MARTIN STRAUSS, INVENTOR

BY Larson and Taylor
ATTORNEYS

INVENTOR
MARTIN STRAUSS
BY Larson and Taylor
ATTORNEYS

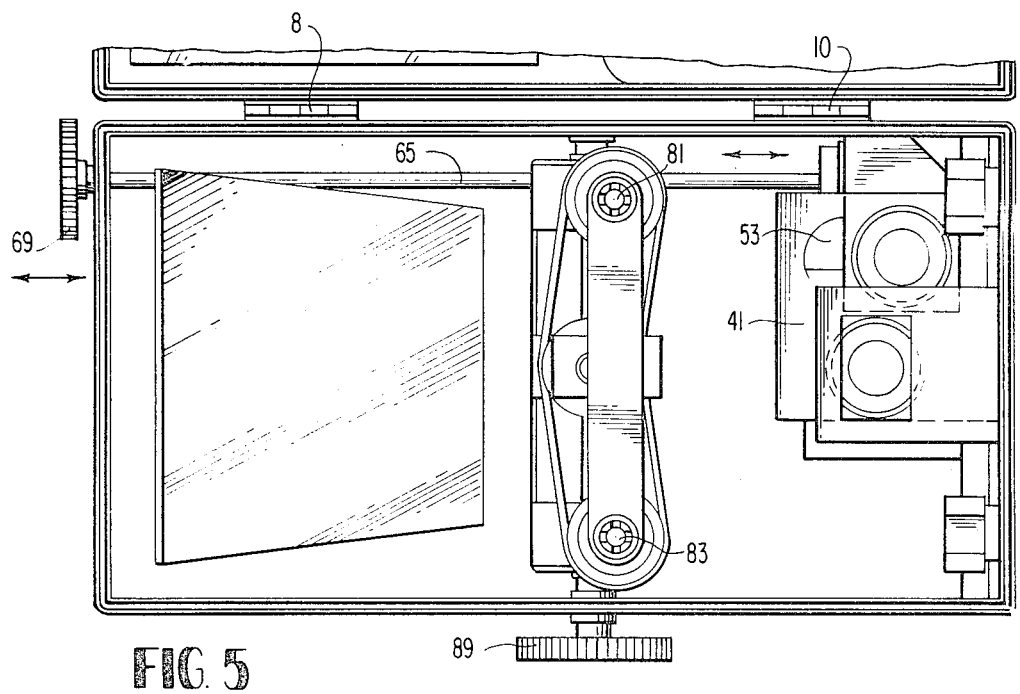
FIG. 5
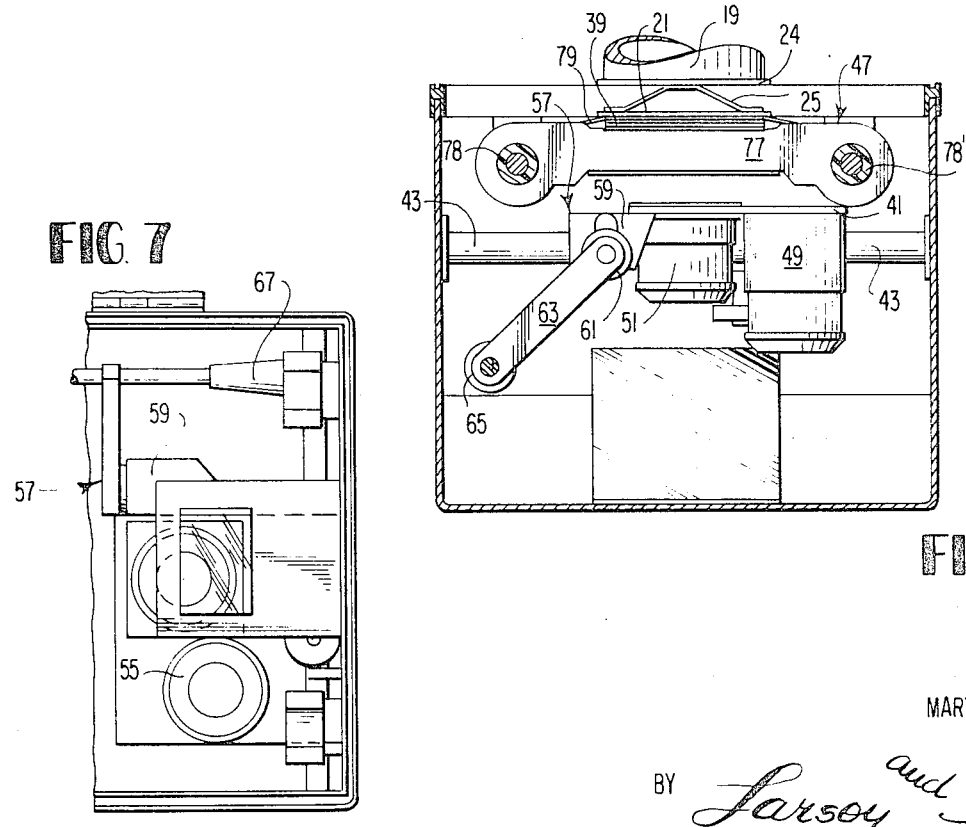
FIG. 7
FIG. 6
INVENTOR
MARTIN STRAUSS

PROJECTOR

This invention relates to a film projector and more particularly to a compact, portable projector adapted to project positive images onto a self-containing screen.

If one has ever been on an extended trip wherein he has been endowed with the navigational responsibilities, he is fully familiar with the map reading that is unavoidably involved and the awkward and frustrating moments that it often creates. How often has one had to pull off the road because either he or the delegated navigator can't find the right direction on the crumpled, oversized road map; or during night driving, how many times has one had to stop the vehicle in search of a reading light because the light in the vehicle is out or inadequate and he left the flashlight at home.

The same difficulties are evident in boating where navigational maps or charts tend to be of even larger and more cumbersome size. In boating, moreover, there is the additional problem that the navigational maps or charts tend to get wet.

It is quite evident that a need exists for a means enabling map selection and reading with facility and detailed accuracy and which in addition is compact, portable and waterproof.

It is accordingly one object of this invention to provide an apparatus which is compact, portable and relatively inexpensive and which avoids the shortcomings of conventional map reading.

Another object of the invention is to provide a projector particularly adapted as a map projector for use in vehicles such as automobiles and boats where map reading is desirable for navigational purposes.

Yet another object of the invention is to provide a projector of the type referred to which is adapted to cooperate with a self-contained film cartridge so that the film used need not be threaded through the projector and which projects film onto a self-contained image surface.

A further object of the invention is to provide a projector of the type referred to which offers two different magnifications from the same film frame and a means for scanning the film frame at the larger magnification for more detailed reading.

Still a further object of the invention is to provide a waterproof method for displaying maps.

These and other objects of the invention are provided by a projector comprising a film supply support and a film receiving support for film supply means and film receiving means, respectively, means for advancing film from said film supply means to said film receiving means, a light source providing light through said film, an image surface, an optical system for projecting an image from the film to said image surface, said optical system comprising a lens of of lower magnification and a lens of higher magnification positioned transversely one to the other with respect to a common field of view, shifting means for interchangeably positioning said lenses behind said film, said lens of higher magnification projecting an image reduced in area compared to that projected by said lens of lower magnification, means for moving said lens of higher magnification to project select areas of the image projected by said lens of lower magnification. The optical system advantageously includes one or more reflective surfaces oriented to reflect the optical axis to the image surface.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIG. 5 is an elevational view of the bottom portion of the projector with the film and film supply and receiving means swung away from and at right angles to the optical system;

FIG. 6 is a side elevational view taken along line 6—$6^1$ of FIG. 3 showing the lens of higher magnification in projecting position; and FIG. 7 is a top elevational view of the optical system showing the lens of higher magnification in projecting position.

Figure 1:
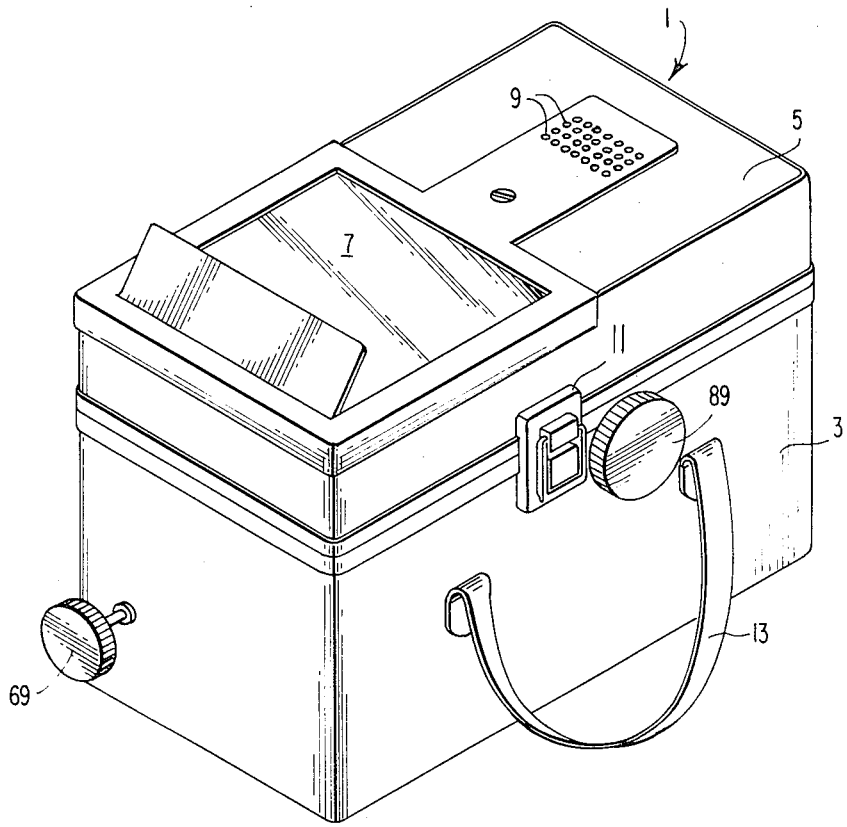
FIG. 1 is a perspective view of the projector.

As shown in FIG. 1, the projector comprises a case, indicated generally as 1, composed of a bottom portion 3 and a top portion 5 hingedly attached by means of hinges 8 and 10. (See FIG. 3). Top portion 5 is provided with an image surface, preferably a translucent screen 7, and a perforated vent plate 9. A latch means 11 serves to latch together the bottom and top portions of the case. Straps 13 are provided on each side of the case 1 which when grasped together comprise convenient means for carrying the case.

Figure 2:
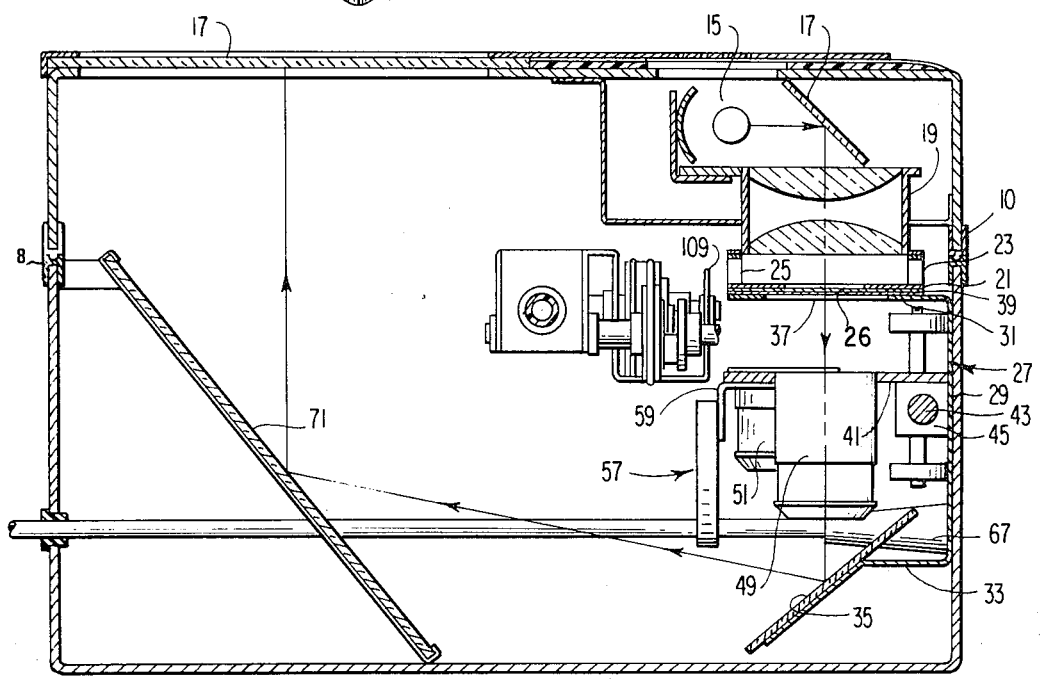
FIG. 2 is a cross-sectional side view of the projector.
Figure 3:
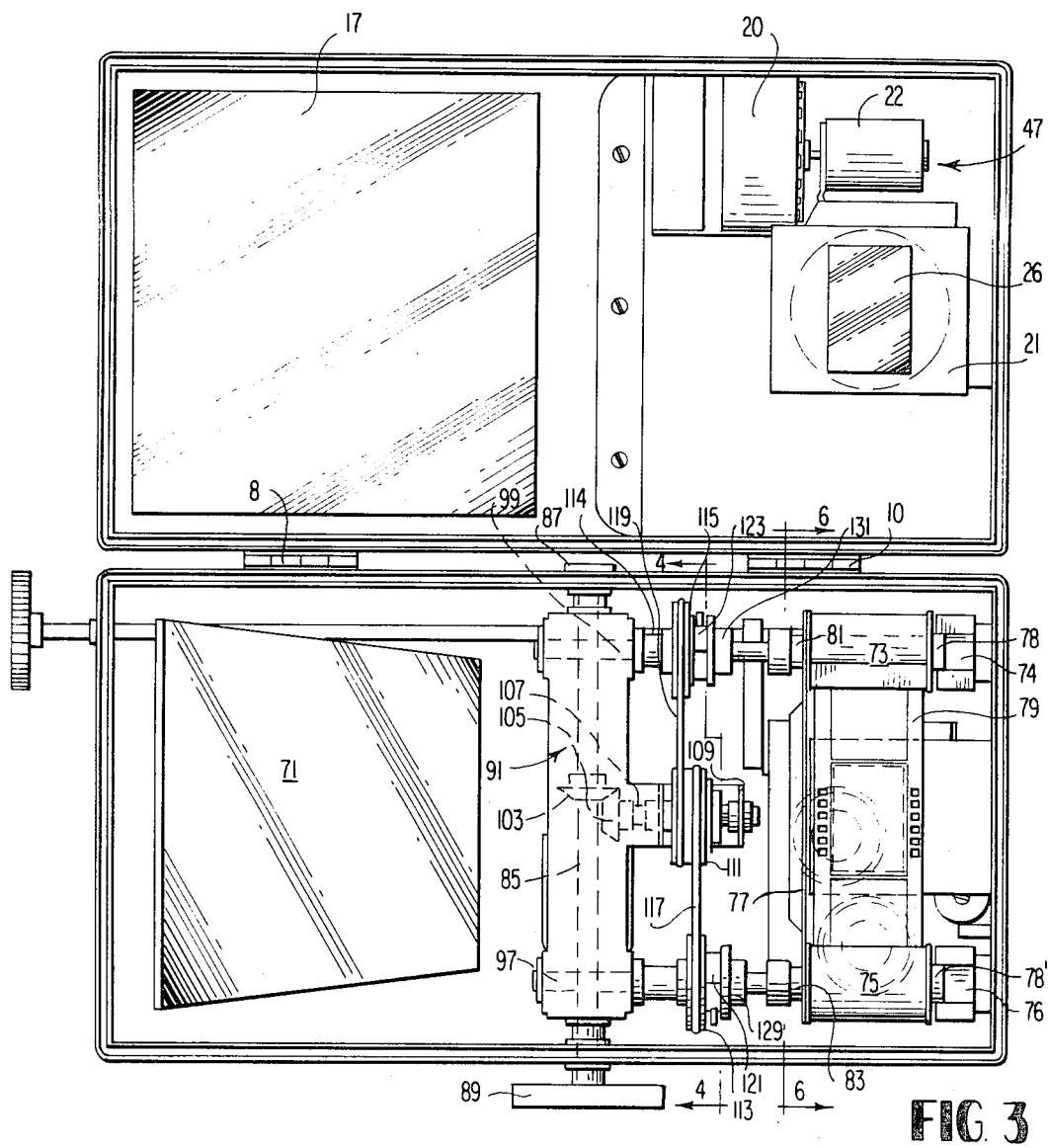
FIG. 3 is a top elevational view of the projector with the top swung open to reveal the inside of the projector.

Directing particular attention to FIGS. 2 and 6, there is provided within case 1, a light source such as lamp 15, a concave reflecting mirror 17, positioned to reflect the light from lamp 15 through a double condensor lens 19. A fan 20 and an electric motor 22 for driving the fan are provided adjacent the lamp 15, as shown in FIG. 3, to keep the case cool. Both electric motor 22 and lamp 15 are connected to an electric cord (not shown) which may be adapted to be plugged into any electrical outlet as, for instance, the cigarette lighter of a moving vehicle. Condensor lens 19 contains a condensor base member 24 which rests on a spring-cushioned pressure plate comprised of a base plate 21 and biased springs 23 and 25 each fastened to condensor base member 24. The base plate 21 contains a glass-fitted aperture 26. Immediately below the pressure plate is positioned an optical chassis, indicated generally as 27, comprised of a vertical section 29, a top horizontal section 31, a bottom section 33, which is horizontal in part and then angled to support a reflecting surface such as front surface mirror 35. Horizontal section 31 of the optical chassis is provided with an aperture 37 through which light passes, after being concentrated by means of the double condensor lens 19. A glass plate 39 is preferably placed over the aperture 37.

Within optical chassis 29 and spaced a short distance from top section 31 of the chassis is placed a lens carriage 41 slidably mounted on a fixed shaft 43. The mounting of carriage 41 on fixed shaft 43 is preferably by way of sleeve 45 attached to said carriage which is advantageously of a lubricious material such as Teflon in order to faciltate sliding. The distance the lens carriage 41 is spaced from top section 31 of the optical chassis 27 is that distance which will snugly accommodate the film supply and receiving means as, for example a film cartridge indicated generally as 47. (See FIG. 6). Lens carriage 41 carries two lenses; a lens of lower magnification such as lens 49 of normal magnification and a lens 51 of higher magnification, which projects a magnified image of a portion of the film within aperture 37 whereas the lens of lower magnification projects an image of the entire film within aperture 37. Lens 49 of lower magnification is fixedly mounted onto lens carriage 41 while lens 51 of higher magnification is slidably mounted on the carriage within an elliptical slot 53 (FIG. 5) which extends beyond either side of opening 55 of the carriage within which lens 49 of normal magnification is fixedly mounted. Both lenses are preset to project an image that is in focus.

Lens carriage 41 is operably connected to a shifting means, indicated generally as 57, which is adapted to slide the carriage along shaft 43 thereby enabling the interchangeable positioning of lens 49 and lens 51 into projecting position. The shifting means 57 also slides lens 51 of high magnification within slot 53 across the field of view, that is, in a direction substantially at right angles to that in which carriage 41 slides on fixed shaft 43. Thus, shifting means 57 serves not only to interchangeably position the respective lenses behind the film frame to be projected but also to move the lens 51 of higher magnification back and forth in two mutually perpendicular directions so that a given film frame may be scanned to project a select area of the film frame at the higher magnification.

As best shown in FIG. 2 and 6, shifting means 57 comprises a bracket 59 having a generally vertically extending slot therein, bracket 59 being fixedly mounted on lens 51 and movable therewith when the latter moves within elliptical opening 53. Slidable within the slot in bracket 59 is a roller 61 which is rotatably mounted on the end of an arm 63. Roller 61 is centrally grooved so as to have end wall portions overlying the side faces of bracket 59 adjacent the slot as seen in FIG. 6. The opposite end of arm 63 is fixedly mounted on a shaft 65 which extends through an end wall and has a knurlled knob 69 secured on the end thereof. Mounted on the opposite wall is a sleeve 67 of Teflon or the like, this sleeve being elongated and having a bore therethrough to receive the end of shaft 65. Thus it can be seen that shaft 65 can be moved longitudinally so as to move arm 63, bracket 59 and lens 51 within the elliptical opening 53. By turning knurlled knob 69 the lens carriage is slidable on shaft 43 through the engagement of the roller 61 on arm 63 with the slot in bracket 59.

In the embodiment shown in the drawings, the optical system includes a surface mirror 35 oriented to reflect the image to a second surface mirror 71 which is also oriented to reflect the image a second time to the image surface or translucent screen 7. It is to be understood that the number and orientation of any reflecting surfaces employed in the optical system will depend upon the particular position of the translucent screen.

The film cartridge 47 comprises a pair of spool housings 73 and 75 interconnected by an end plate 77. Within spool housings 73 and 75 rotate spools 78 and 78', respectively, and a film 79 is wound on the spools and, this film extends between the housings as shown in FIG. 3. End plate 77 has central apertures therein aligned with the rotatable spools 78 and 78' is that the drivings shafts 81 and 83 (FIG. 5) of the film advancing mechanism may drivingly engage the rotatable spools. The ends of spools 78 and 78' opposite to plate 77 extend beyond the ends of spool housings 73 and 75, respectively, as shown in FIG. 3. These end portions of the spools rest in semicircular bearings 74 and 76, respectively, these bearings being fixedly mounted on the casing end wall.

Figure 4:
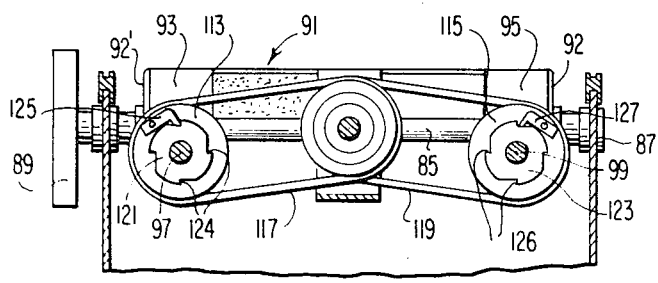
FIG. 4 is a cross-sectional view taken along line 4—$4^1$ of FIG. 3.

The mechanism for advancing the film will now be described. Referring to FIGS. 3-5, the advancing mechanism is mounted on a main shaft 85 which extends across the width of case 1 and through each side of the case. One end of shaft 85 is rotatably mounted in a journal 87 and at the other end is provided with a knob 89. There is provided a frame 91 having end flanges 92 and 92' journalled on shaft 85. Frame 91 is also provided with a pair of side flanges 93 adjacent end flange 92' in which a shaft 97 is journalled and the frame 91 has a pair of side flanges 95 adjacent end flange 92 in which a shaft 99 is journalled. At the end of shafts 97 and 99 are fixedly attached film supply support member 83 and film receiving support member 81, respectively. Frame 91 is provided with a central U shaped flange 109 which forms a pair of spaced bearing supports for a shaft 107. Shaft 107 has a bevel gear 105 on one end thereof which engages a bevel gear 103 on shaft 85. Thus it can be seen that by rotation of knob 89 shaft 85 drives shaft 107. Mounted on shaft 107 is a pulley 111 which drives pulleys 113 and 115 by means of spring belts 117 and 119 respectively. Pulleys 113 and 115 are mounted to rotate freely on shafts 97 and 99 respectively. Ratchet 121 is secured to the face of pulley 113 and is rotatable therewith and ratchet 123 is secured to the face of pulley 115 and is rotatable therewith. Secured to shaft 97 is a circular plate 129 having a pawl 125 pivoted on a face thereof so as to be spring urged into engatement with ratchet 121. Similarly circular plate 131 fixed on shaft 99 has pawl 127 spring urged into engagement with ratchet 123.

It can be seen that where the knob 89 is rotated the pulleys 113 and 115 are driven in opposite directions through shaft 85, bevel gears 103, 105, shaft 107, pulley 111 and spring belts 114 and 117. In one direction of rotation of knob 89 the ratchet 121 will be rotated into engagement with pawl 125 so as to drive the shaft 97 whereas the ratchet 123 will not engage pawl 127 so that shaft 99 is rotatable independently of the drive mechanism. Similarly when knob 89 is rotated in the opposite direction shaft 99 is driven and shaft 97 is rotatable independently of the drive mechanism. Thus, it can be seen that the film within the film cartridge may be rolled from one spool to the other by means of the engagement of the film spools 78 and 78' with support members 81 and 83 respectively.

In operation of the projector, the case is opened and knob 89 is turned in a counterclockwise direction which with the top open swings the film cartridge support and advancing mechanism into an upright position such as is shown in FIG. 5, to facilitate loading of the projector. The selected film cartridge is inserted into support members 81 and 83 and lowered into viewing position by turning knob 89 in a clockwise direction. The end portion of rotatable spool 78 comes to rest on bearing 74 and the end portion of rotatable spool 78' comes to rest on bearing 76 as seen in FIG. 3. The film 79 traverses glass plate 39 over aperture 37. Top 5 of case 1 is then closed. The closing positions spring-cushioned pressure base plate 21 over film 79 as shown in FIG. 6. The end portion of base plate 21 is extended to overlie flange 109 of the film operating mechanism as shown in FIG. 2 so that the film operating mechanism cannot be rotated to the FIG. 5 position with the cover closed. This enables either advancement of the film by moving knob 89 in a counterclockwise direction or a return of the film by moving the knob 89 in a clockwise direction. After top 5 is closed, the electrical cord is plugged into an electrical outlet which turns on both lamp 15 and cooling fan 20. Light passing from lamp 15 is reflected by mirror 17 through double condenser lenses 19 where it is concentrated and passed sequentially through glass-fitted aperture 26 of pressure base plate 21, film 79, glass plate 39, aperture 37 on optical chassis 29, and either lens 49 or lens 51 which projects the image onto mirror 35. Mirror 35 reflects the image onto mirror 71 which in turn reflects it onto translucent screen 17 for viewing from outside case 1.

Turning knob 69 counterclockwise as far as it will go places lens 49 of normal magnification into position for projection. Knob 89 is then turned to move film 79 across the glass plate 39. When the desired film frame is adjusted into position by the turning of knob 89, lens 51 of higher magnification may be switched behind the film into projecting position by turning knob 69 in a clockwise direction. The film frame may be then scanned across by pulling and pushing knob 69 in and out and the film frame may be scanned up and down by turning knob 69 counterclockwise and clockwise, respectively.

The film cartridge may be provided with sequential road maps so that a driver can easily turn the film to the particular area of interest. If necessary a specific locale within the map being viewed may be enlarged by shifting to the higher magnification lens. With the projector disclosed herein it is possible to provide road maps of the entire United States on a few cartridges and it is possible to provide an index with a dialing means so that any selected area may be quickly viewed.

Although the invention has been described with reference to a portable projector it obviously can be secured or otherwise adapted for use in a permanent position. For instance, the projector of the invention may be easily placed in the dashboard of an automobile or other moving vehicle or on the instrument panel or cabin walls of a boat. Further, it is also evident that the projector may be used to display any images suitable for recording on film.

While there have been described herein at present considered preferred embodiments of the invention, it would be obvious that those skilled in the art that modifications and changes may be made without departing from the essence of the invention. It is therefore to be understood that the exemplary embodiments are illustrative only and not restrictive of the invention, the scope of which is defined in the meaning and range of equivalency of the claims are intended to be included therein.

It is claimed:

1. A projector comprising a film supply support and a film receiving support for film supply means and film receiving means, respectively, means for advancing film from said film supply means to said film receiving means, a light source position to pass light through said film, a translucent screen, an optical system having an optical axis and projecting an image from the film to said screen, said optical system comprising a lens of lower magnification and a lens of higher magnification both mounted on a single carriage, a fixed shaft positioned on the opposite side of the film from the light source along an axis transverse to the optical axis the carriage is slidably mounted on the shaft for movement along its axis, shifting means connected to said carriage for both interchangeably positioning the respective lenses relative to said film by said sliding movement and for moving the lens of higher magnification back and forth in two directions so that said film may be scanned to project a select area thereof, said shifting means comprising a cam attached to said carriage, a follower bearing on said cam, an arm attached to said follower, said arm being in turn fixedly connected to a rotatable and longitudinally movable shaft which on longitudinal movement moves said lens of higher magnification in a longitudinal direction perpendicular to the direction of said interchangable positioning of said lenses and when rotated both shifts said lenses and moves said lens of higher magnification in a direction perpendicular to said longitudinal direction, a reflective surface oriented to reflect the optical axis of the projecting lens to a second reflecting surface, said second reflecting surface oriented to reflect said optical path to said translucent screen, said translucent screen being positioned adjacent and perpendicular to the optical axis of the projecting lens.

2. The projector of claim 1 wherein the optical system includes a reflective surface oriented to reflect the optical axis to said image surface.

3. The projector of claim 1 wherein the optical system includes a reflective surface oriented to reflect the optical axis of the projecting lens to a second reflecting surface, said second reflecting surface, oriented to reflect the optical axis of said lens to said image surface.

4. The projector of claim 3 wherein the image surface is adjacent and perpendicular to the optical axis of the projecting lens.

5. The projector of claim 3 wherein the image surface is a translucent screen.

6. The projector of claim 1 wherein is included a condenser lens positioned behind the light source for concentrating the light on the film.

7. The projector of claim 6 wherein is included a reflecting surface for said light source.

8. The projector of claim 6 wherein said condenser lens has a base provided with a spring cushioned pressure plate having an aperature and adapted to cooperate with the film through which said light passes.

* * * * *